United States Patent
Seo et al.

(10) Patent No.: US 10,416,818 B2
(45) Date of Patent: Sep. 17, 2019

(54) DISPLAY DEVICE WITH TOUCH SCREEN PANEL

(71) Applicant: LG Display Co., Ltd., Seoul (KR)

(72) Inventors: Sangwoo Seo, Daegu (KR); Dowan Kim, Paju (KR)

(73) Assignee: LG Display Co., Ltd., Seoul (KR)

(*) Notice: Subject to any disclaimer, the term of this patent is extended or adjusted under 35 U.S.C. 154(b) by 48 days.

(21) Appl. No.: 15/348,519

(22) Filed: Nov. 10, 2016

(65) Prior Publication Data

US 2017/0153729 A1  Jun. 1, 2017

(30) Foreign Application Priority Data

Nov. 27, 2015  (KR) .......................... 10-2015-0167478

(51) Int. Cl.
   *G06F 3/044*   (2006.01)
   *G02F 1/1335*  (2006.01)
   *G02F 1/1362*  (2006.01)
   *G06F 3/041*   (2006.01)

(52) U.S. Cl.
   CPC ........ *G06F 3/044* (2013.01); *G02F 1/133509* (2013.01); *G02F 1/133512* (2013.01); *G02F 1/136209* (2013.01); *G06F 3/041* (2013.01); *G06F 2203/04107* (2013.01)

(58) Field of Classification Search
   CPC ............................... G06F 3/044; G06F 3/0412
   See application file for complete search history.

(56) References Cited

U.S. PATENT DOCUMENTS

| | | | | |
|---|---|---|---|---|
| 6,022,645 A | * | 2/2000 | Lin | G03F 1/29 430/5 |
| 2010/0220071 A1 | * | 9/2010 | Nishihara | G06F 3/0416 345/173 |
| 2011/0242057 A1 | * | 10/2011 | Lee | G06F 3/041 345/176 |
| 2011/0242465 A1 | * | 10/2011 | Lee | G02F 1/133308 349/110 |
| 2013/0038542 A1 | * | 2/2013 | Kim | G06F 3/041 345/173 |

(Continued)

FOREIGN PATENT DOCUMENTS

| KR | 10-2012-0076065 A | 7/2012 |
|---|---|---|
| KR | 10-2015-0000383 A | 1/2015 |

OTHER PUBLICATIONS

European Extended Search Report, European Application No. 16194030.9, dated Feb. 17, 2017, 8 pages.

*Primary Examiner* — Yuzhen Shen
(74) *Attorney, Agent, or Firm* — Fenwick & West LLP

(57) ABSTRACT

A display device with a panel for preventing a light leakage is disclosed. The display device with the panel includes a display panel including an active area, on which information is displayed, and a first light shielding area positioned outside the active area and a panel disposed on the display panel. The panel includes a touch area having a size wider than the active area, a second light shielding area positioned outside the touch area, and a third light shielding area ranging from a start position of the first light shielding area to a start position of the second light shielding area. At least one dummy pattern is disposed in the third light shielding area of the panel.

20 Claims, 11 Drawing Sheets

(56) References Cited

U.S. PATENT DOCUMENTS

| | | | |
|---|---|---|---|
| 2013/0043068 A1* | 2/2013 | Xie | G06F 3/044 174/262 |
| 2014/0225843 A1 | 8/2014 | Kuo | |
| 2015/0114815 A1 | 4/2015 | Chang et al. | |
| 2015/0253809 A1* | 9/2015 | Hata | G06F 3/044 345/173 |

* cited by examiner

DISPLAY DEVICE WITH TOUCH SCREEN PANEL

This application claims the benefit of priority under 35 U.S.C. § 119(a) to Korean Patent Application No. 10-2015-0167478 filed on Nov. 27, 2015, which is incorporated by reference herein in its entirety.

BACKGROUND OF THE INVENTION

Field of the Invention

The present disclosure relates to a display device with a touch screen panel, and more particularly to a display device with a touch screen panel for preventing a light leakage from being generated in a touch area due to a coupling of the touch screen panel and the display device.

Discussion of the Related Art

Various input devices, such as a keyboard, a mouse, a track ball, a joystick, and a digitizer, allow users to interface with home appliances or information telecommunication devices. However, when the user makes use of these input devices, user's dissatisfaction may increase due to the learning curve for getting used to the input devices and space the input devices occupy. Thus, there is a need for a convenient and simple input device capable of reducing erroneous operations.

Touch screen panels are classified into a resistive type, a capacitive type, an electromagnetic type, etc. based on a method for sensing a touched portion. The resistive touch screen panel determines a touched position by a voltage gradient based on changes of resistance in a state where a DC voltage is applied to metal electrodes formed, or located, on an upper plate or a lower plate. The capacitive touch screen panel senses a touched position based on changes in capacitance generated in an upper plate or a lower plate when the user touches an equipotential conductive film formed, or located, on the upper or lower plate. The electromagnetic touch screen panel senses a touched portion by reading an LC value induced when an electronic pen touches a conductive film. In addition, an optical touch screen panel, an ultrasonic touch screen panel, etc. are known.

The capacitive touch screen panel may be subdivided into a self-capacitive touch screen panel and a mutual capacitive touch screen panel. The self-capacitive touch screen panel forms a plurality of independent patterns in a touch area of the touch screen panel and measures changes in a capacitance of each independent pattern, thereby determining whether or not a touch operation is performed. The mutual capacitive touch screen panel crosses X-axis electrode lines (for example, driving electrode lines) and Y-axis electrode lines (for example, sensing electrode lines) in a touch electrode formation area of the touch screen panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby determining whether or not a touch operation is performed.

A related art display device (hereinafter simply referred to as "a display device with a touch screen panel") including a capacitive touch screen panel is described below with reference to FIGS. 1 to 2B.

FIG. 1 is a plan view of a related art display device with a touch screen panel. FIG. 2A is a plan view schematically showing an active area, a touch area, and a visible area of FIG. 1, and FIG. 2B is a cross-sectional view schematically showing a cross section of FIG. 1.

Referring to FIGS. 1 to 2B, a related art display device with a touch screen panel includes a display panel DP, a touch screen panel TP disposed on the display panel DP, and a cover window CW attached to the touch screen panel TP using an optically clear adhesive.

The display panel DP includes an active area AA, on which information is displayed, and a first light shielding area BA1 positioned outside the active area AA. Display elements may be disposed in the active area AA, and lines used to supply various signals to the display elements and a display driver may be disposed in the first light shielding area BA1. The display panel DP may use a panel of a flat panel display, such as a liquid crystal display (LCD), an organic light emitting diode (OLED) display, a field emission display (FED), a plasma display panel (PDP), and electrophoresis display (EPD).

The touch screen panel TP includes a touch area TA and a second light shielding area BA2 positioned outside the touch area TA. The touch area TA includes first touch electrodes TS1 to TS5 and second touch electrodes RS1 to RS6 which are disposed to cross each other. The second light shielding area BA2 includes first and second routing wires TW1 to TW5 and RW1 to RW6 for transmitting and receiving signals to and from the first and second touch electrodes TS1 to TS5 and RS1 to RS6. The second light shielding area BA2 includes also first and second touch pads TP1 to TP5 and RP1 to RP6 which are connected to the first and second routing wires TW1 to TW5 and RW1 to RW6 and transmit and receive signals to and from the outside.

In the related art display device with the touch screen panel, bubbles may be generated in a contact portion of the display panel DP and the touch screen panel TP. As shown in FIG. 2B, when bubbles are generated in the contact portion, light generated in the active area AA of the display panel DP may leak into the first light shielding area BA1 of the display panel DP and may be upwardly emitted from an end of the touch area TA of the touch screen panel TP. If a bubble is not generated, the light may be shielded by the first light shielding area BA1 of the display panel DP. However, when the bubbles are generated, for example, due to a bad adhesion, etc., the light leaked into the first light shielding area BA1 may be upwardly emitted from the end of the touch area TA through the bubbles. Thus, because the related art display device with the touch screen panel leaks light into the light shielding area, a boundary between the active area AA, on which information is displayed, and the first light shielding area BA1, on which the information is not displayed, may be blurred or unclear.

SUMMARY OF THE INVENTION

The present disclosure provides a display device with a panel preventing light generated in a display panel from being leaked into a shielding area even when bubbles are generated in a contact portion of the display panel and a panel due to bad adhesion.

In one aspect, there is provided a display device with a display panel including an active area, on which information is displayed, and a first light shielding area positioned outside the active area and a panel disposed on the display panel, the panel including a first panel area having a size wider than the active area, a second light shielding area positioned outside the first panel area, and a third light shielding area ranging from a start position of the first light shielding area to a start position of the second light shielding area, wherein at least one dummy pattern is disposed in the third light shielding area of the panel.

In one embodiment, the at least one dummy pattern includes a first dummy pattern disposed in the third light shielding area on one surface of the panel.

In one embodiment, the at least one dummy pattern includes a second dummy pattern disposed in the third light shielding area on another surface of the panel.

In one embodiment, the panel has an upper surface and a lower surface, wherein the lower surface faces the display panel.

In one embodiment, the at least one dummy pattern is disposed on one of the upper surface and the lower surface of the panel.

In one embodiment, the at least one dummy pattern comprises a first dummy pattern and a second dummy pattern. The first dummy pattern may be on the lower surface of the panel. The second dummy pattern may be on an upper surface of the panel.

In one embodiment, the first dummy pattern and the second dummy pattern is disposed to at least partially overlap each other. At least one of the first dummy pattern and the second dummy pattern may comprise a pattern with a plurality of unconnected areas.

In one embodiment, the first dummy pattern is disposed in the third light shielding area as a continuous area, the second dummy pattern disposed in the third light shielding area as a pattern with a plurality of unconnected areas, with the second dummy pattern overlapping the first dummy pattern.

In one embodiment, the first and second dummy pattern is disposed in the third light shielding area, the first and second dummy pattern are disposed as pattern with a plurality of unconnected areas, and the first dummy pattern and the second dummy pattern are disposed so that their respective areas are alternately disposed.

In one embodiment, the second dummy pattern is disposed in the third light shielding area as a continuous area, the first dummy pattern is disposed in the third light shielding area as a pattern with a plurality of unconnected areas, and the first dummy pattern overlaps the second dummy pattern.

In one embodiment, the panel is a touch screen panel and the first panel area is a touch area.

In one embodiment, the display device with a touch screen panel comprises a display panel including an active area, on which information is displayed, and a first light shielding area positioned adjacent to and outside of the active area. The touch screen panel overlaps the active area. In particular, the touch screen panel may at least partially overlap the active area. As noted above, the touch screen panel includes a touch area having a size wider than the active area. In other words, the touch screen panel may include a touch area that extends beyond the active area. The second light shielding area may be positioned adjacent to and outside of the touch area.

In one embodiment, the third light shielding area is considered to be positioned in the area that extends beyond the active area. The third light shielding area may overlap the first light shielding area. In particular, the third light shielding area may overlap the first light shielding area that neighbours the active area. In turn, the third light shielding area may not be overlapped by the second light shielding area. Overall, the third light shielding area may be positioned in a plane between the plane of the first light shielding area and the second light shielding area.

The display device with the touch screen panel according to the present disclosure disposes the dummy pattern in the third light shielding area of the touch screen panel, in which the first light shielding area of the display panel and the second light shielding area of the touch screen panel do not overlap each other, thereby preventing a light leakage resulting from a bubble, which may be generated in a contact portion of the display panel and the touch screen panel, and improving display quality.

In another aspect, there is provided a display device including a display panel, a second panel, and at least one dummy pattern. The display panel includes an active area on which information is displayed and a first light shielding area adjacent to the active area. The second panel is disposed on the display panel, and includes a transparent area overlapping the display panel and extending beyond the display panel, and a second light shielding area positioned outside the transparent area. The at least one dummy pattern is disposed in a region where the first light shielding area of the display panel and the transparent area of the panel overlap.

In one embodiment, the second panel is a touch panel.

In one embodiment, the at least one dummy pattern is disposed between the display panel and the second panel.

In one embodiment, the second panel has an upper surface and a lower surface, wherein the lower surface faces the display panel, and wherein the at least one dummy pattern in disposed on one of the upper surface and the lower surface of the second panel.

In one embodiment, the second panel has an upper surface and a lower surface, wherein the lower surface faces the display panel. In this embodiment, the at least one dummy pattern comprises a first dummy pattern disposed on the lower surface of the second panel, and a second dummy pattern disposed on the upper surface of the second panel.

In one embodiment, the at least one dummy pattern comprises a plurality of unconnected areas.

In one embodiment, the at least one dummy pattern is made of a light shielding material.

In one embodiment, the at least one dummy pattern is made a metal or alloy.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Many defects may appear in display devices due to bubbles formed in the display device. As used herein, a bubble is a void or gap between two components in a display device. As an example, some bubbles may be formed when laminating adhesive layers with a substrate. The term "adjacent" may be considered to mean next to and in contact with. Thus if one member is adjacent to another, the members are side by side, for example, in relation to the first light shielding area and the active area.

A display device with a touch screen panel according to a first embodiment is described with reference to FIGS. 3 to 5.

Figure 1:
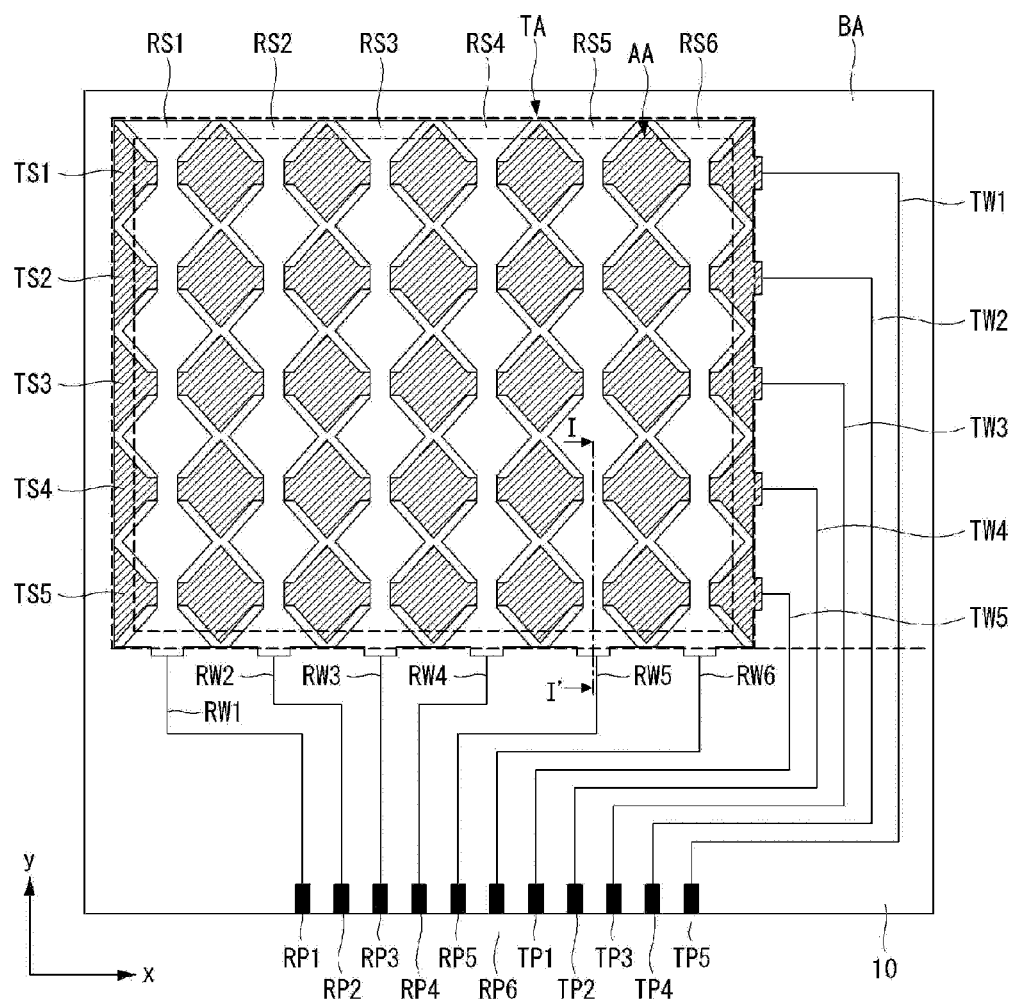
FIG. 1 is a plan view of a related art display device with a touch screen panel.
Figure 2A:
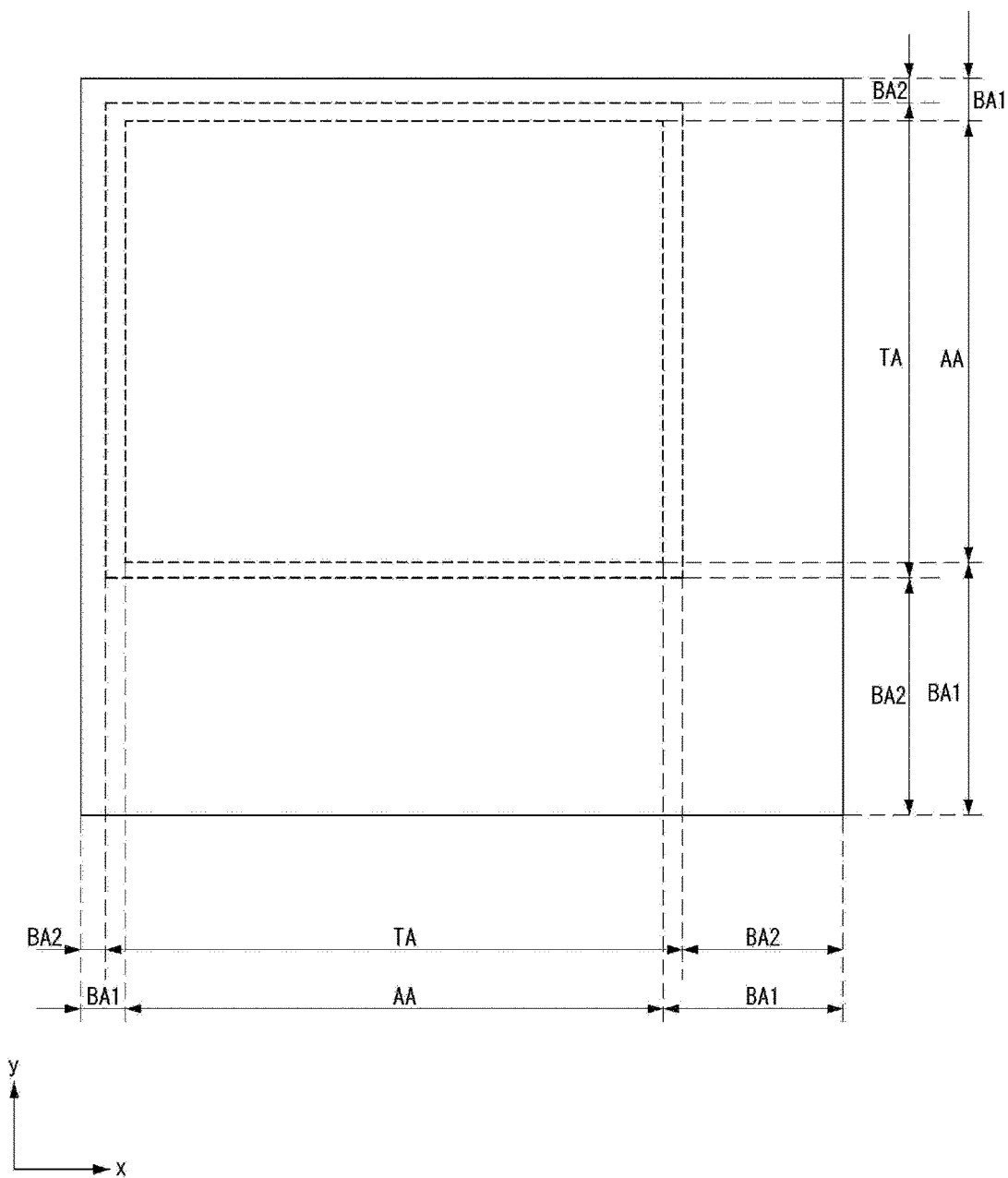
FIG. 2A is a plan view schematically showing an active area, a first light shielding area, and a second light shielding area of FIG. 1.
Figure 2B:
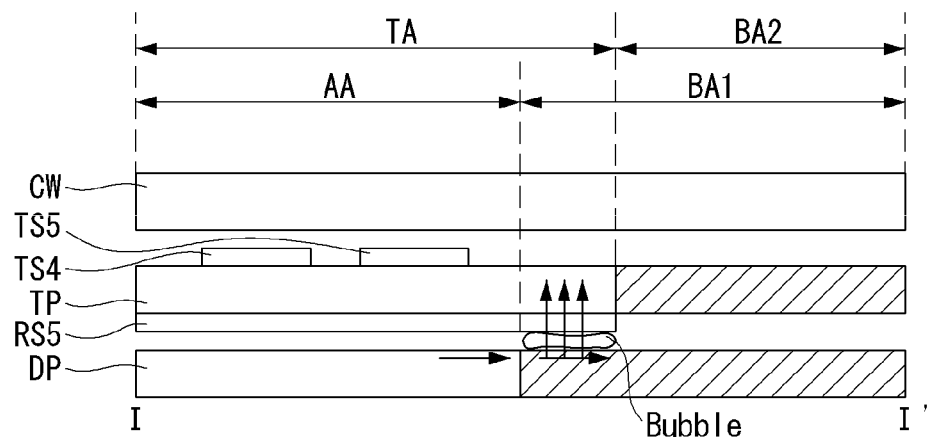
FIG. 2B is a cross-sectional view schematically showing a cross section of FIG. 1.
Figure 3:
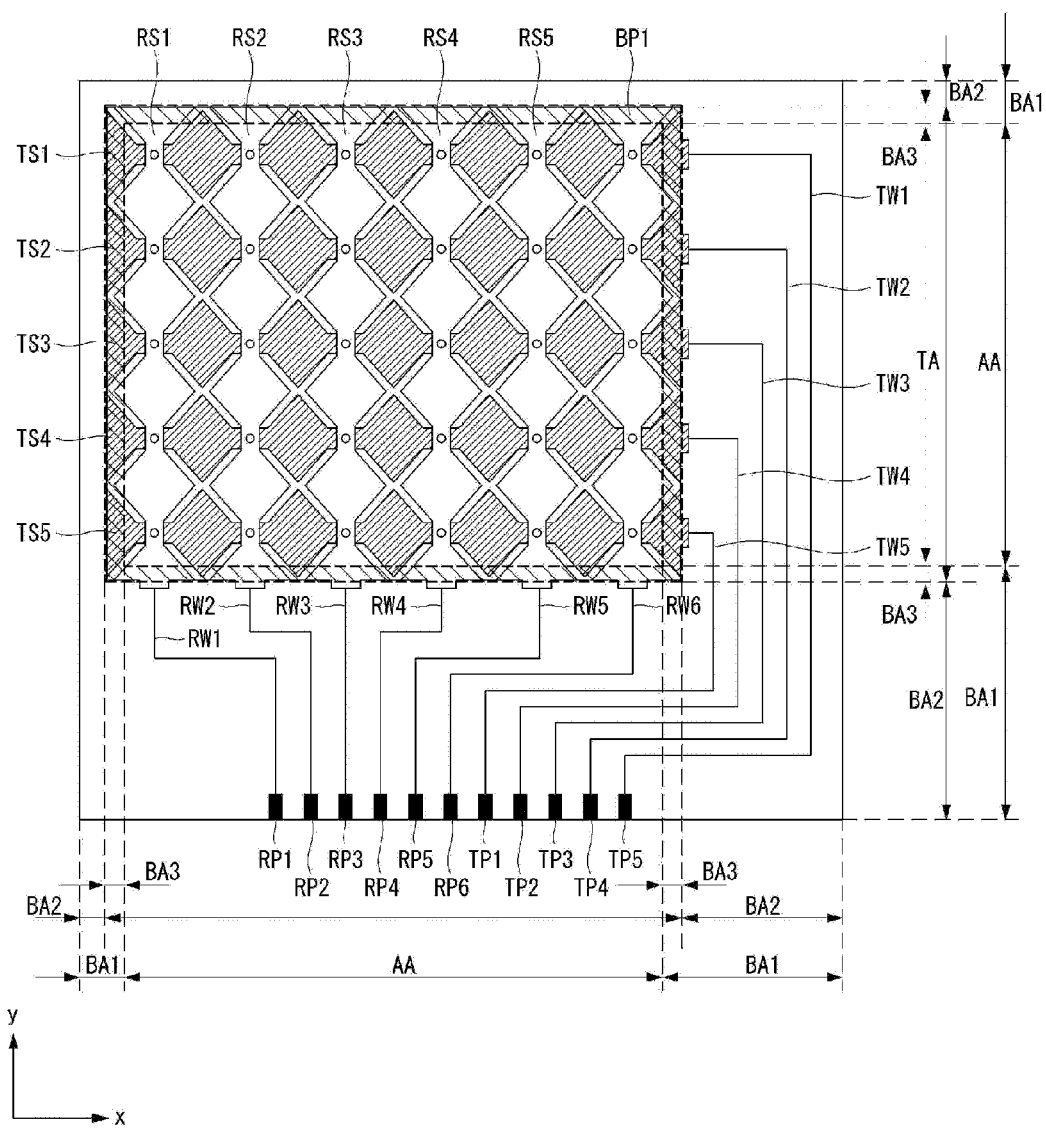
FIG. 3 is a plan view of a display device with a touch screen panel according to a first embodiment.
Figure 4A:
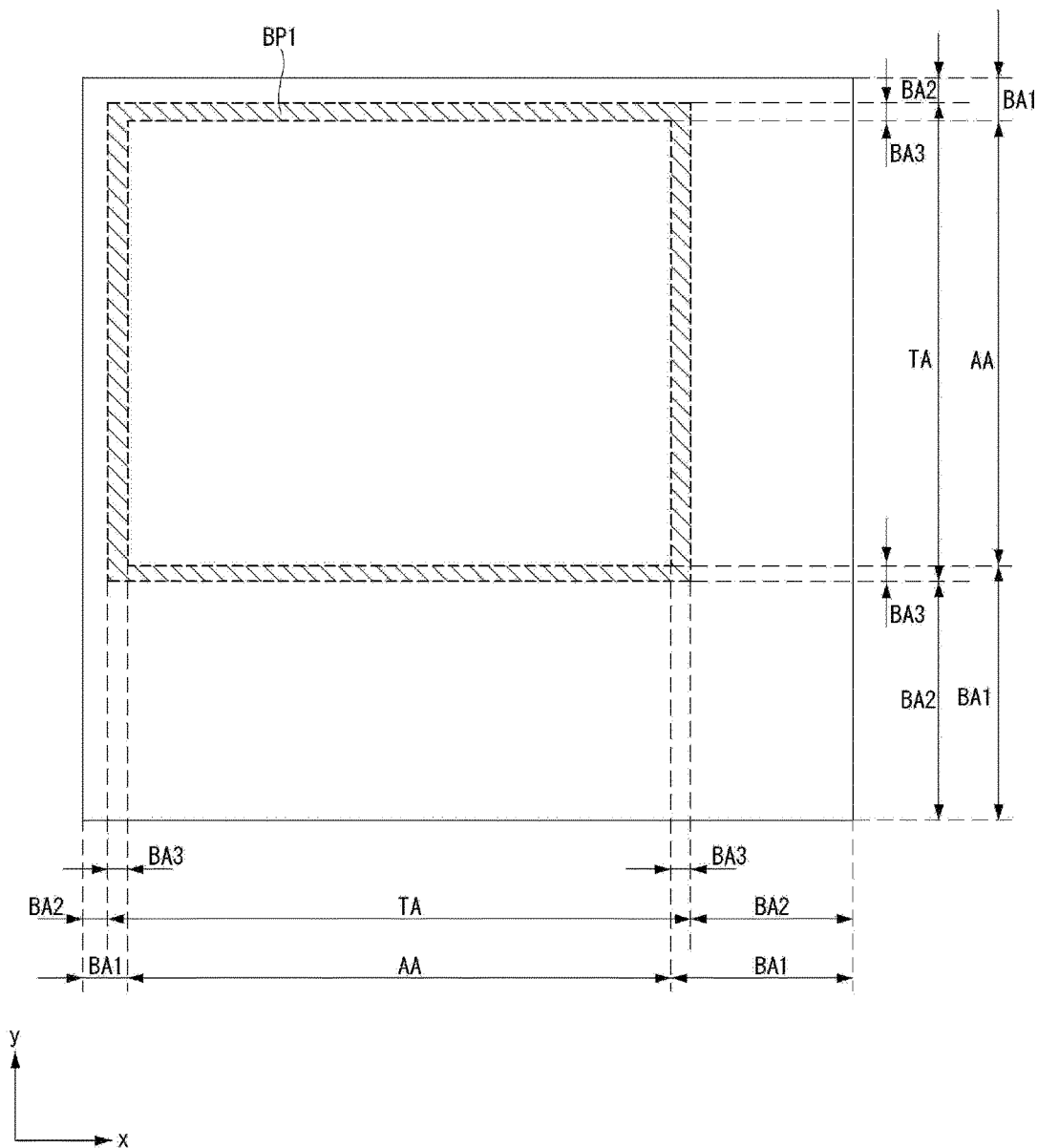
FIG. 4A is a plan view schematically showing an example of a dummy pattern disposed in a third light shielding area shown in FIG. 3.
Figure 4B:
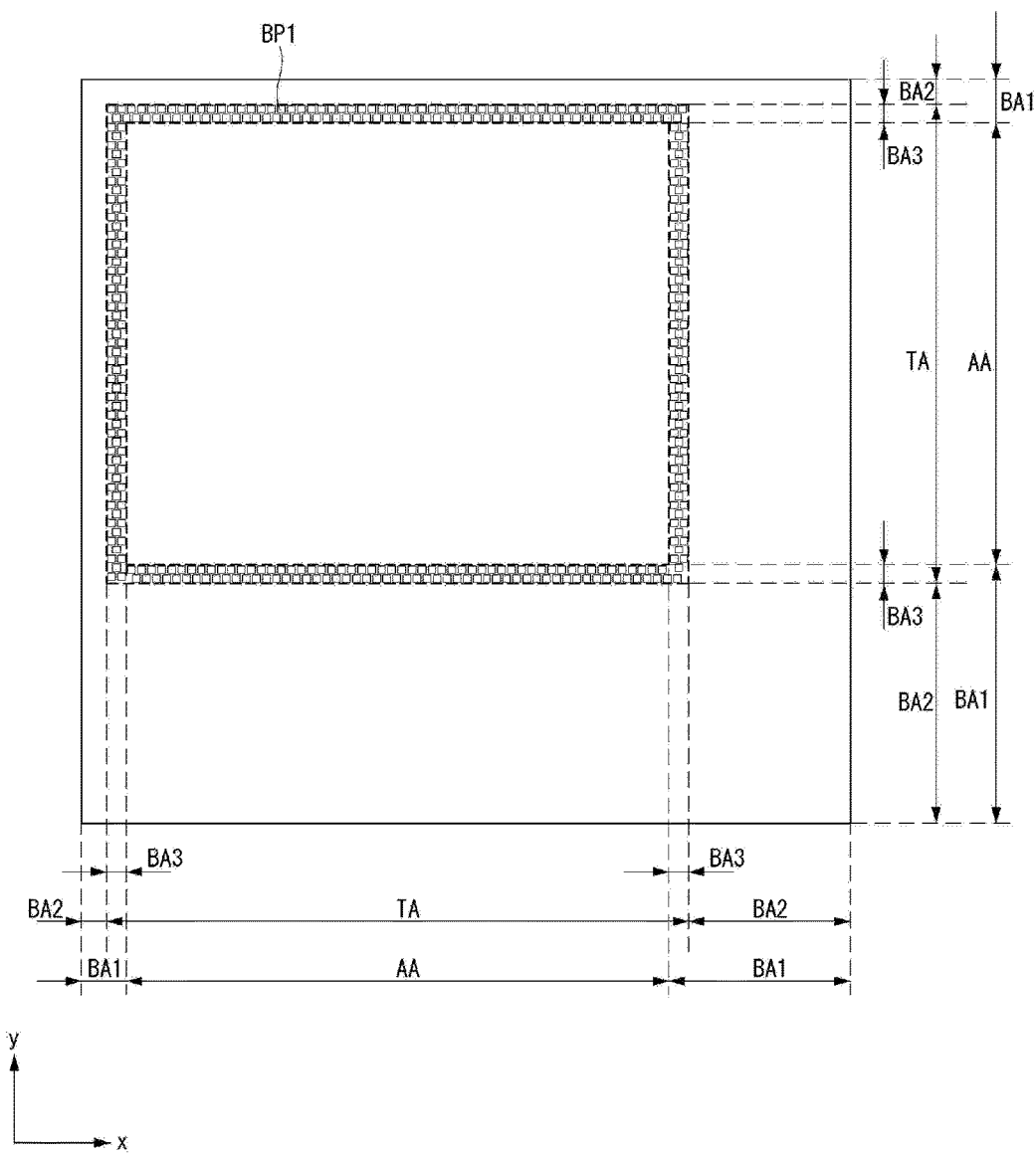
FIG. 4B is a plan view schematically showing another example of a dummy pattern disposed in a third light shielding area shown in FIG. 3.

FIG. 3 is a plan view of a display device with a touch screen panel according to a first embodiment. FIG. 4A is a plan view schematically showing an example of a dummy pattern disposed in a third light shielding area shown in FIG. 3, and FIG. 4B is a plan view schematically showing another example of a dummy pattern disposed in a third light shielding area shown in FIG. 3. FIG. 5 is a cross-sectional view schematically showing a portion of FIG. 3. A "dummy pattern" herein may be considered to be any pattern of opaque material that is configured to shield light. The shielded light may be light that has been diffused-reflected by one or more bubbles. As an example, a dummy pattern may function to prevent light from reaching the viewers of the display device through the bubbles. The dummy pattern may comprise a metal material. The metal material may comprise at least one of Cu, APC (Ag+Pd+Cu), and NiCr.

Figure 5:
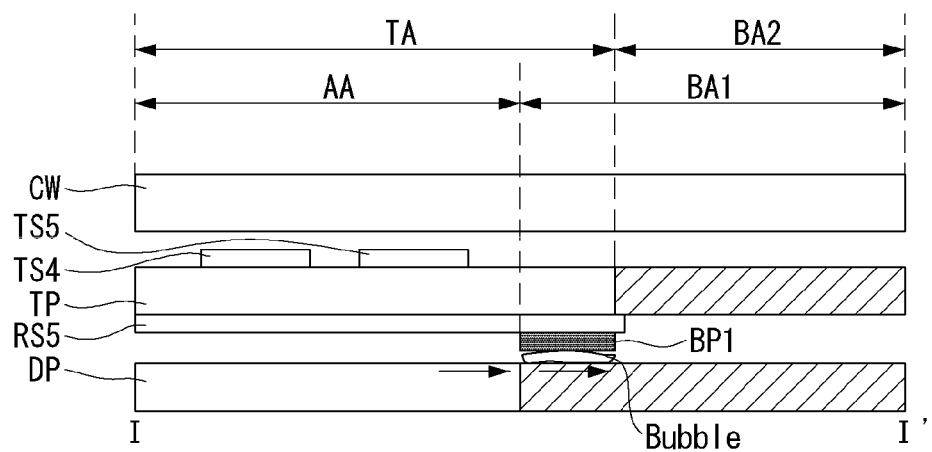
FIG. 5 is a cross-sectional view schematically showing a portion of FIG. 3.

Referring to FIGS. 3 to 5, a display device with a touch screen panel according to a first embodiment includes a display panel DP, a touch screen panel TP disposed on the display panel DP, and a cover window CW attached to the touch screen panel TP using an adhesive, for example, an optically clear adhesive.

The display panel DP includes an active area AA, on which information is displayed, and a first light shielding area BA1 positioned outside the active area AA. Display elements may be disposed in the active area AA, and lines used to supply various signals to the display elements and a display driver may be disposed in the first light shielding area BA1. The display panel DP may use a panel of a flat panel display, such as a liquid crystal display (LCD), an organic light emitting diode (OLED) display, a field emission display (FED), a plasma display panel (PDP), and electrophoresis display (EPD).

The touch screen panel TP includes a touch area TA, a second light shielding area BA2, and a third light shielding area BA3. In some embodiments, the touch area TA and the third light shielding area BA3 are made of a transparent material and the second light shielding area BA2 is made of a light shielding material. Furthermore, the third light shielding area BA3 is a region of the transparent area of the touch screen panel TP that overlaps with the first light shielding area BA1 of the display panel.

The touch area TA includes first touch electrodes TS1 to TS5 and second touch electrodes RS1 to RS6 which are disposed to cross each other.

The first touch electrodes TS1 to TS5 may be formed or located, on one surface of the touch screen panel TP, and the second touch electrodes RS1 to RS6 may be formed or located, on another surface of the touch screen panel TP, for example on a surface of the touch screen panel TP opposite to the surface where the first touch electrodes TS1 to TS5 are formed or located. In some embodiments, the first touch electrodes TS1 to TS5 and the second touch electrodes RS1 to RS6 may be formed or located, on one of both surfaces of the touch screen panel TP. In this embodiment, an insulating pattern is disposed at crossings of the first touch electrodes TS1 to TS5 and the second touch electrodes RS1 to RS6. The insulating pattern prevents the first touch electrodes TS1 to TS5 and the second touch electrodes RS1 to RS6 from contacting each other.

The second light shielding area BA2 is positioned outside the touch area TA. The second light shielding area BA2 includes first and second routing wires TW1 to TW5 and RW1 to RW6 for transmitting and receiving signals to and from the first and second touch electrodes TS1 to TS5 and RS1 to RS6 and first and second touch pads TP1 to TP5 and RP1 to RP6 which are connected to the first and second routing wires TW1 to TW5 and RW1 to RW6 and transmit and receive signals to and from the outside.

The third light shielding area BA3 is an area ranging from a start position of the first light shielding area BA1 of the display panel DP to a start position of the second light shielding area BA2 of the touch screen panel TP.

At least one first dummy pattern BP1 is disposed on one of an upper surface and a lower surface of the third light shielding area BA3 of the touch screen panel TP and surrounds the active area AA of the display panel DP. For example, the first dummy pattern BP1 surrounding the active area AA may be disposed as one pattern in the third light shielding area BA3 on one surface of the touch screen panel TP, or may be divided into a plurality of patterns BP1. A plurality of patterns may be considered to be a pattern comprising a plurality of unconnected areas or a plurality of isolated shapes. Relatedly, one pattern may be considered to be a continuous area. In one embodiment, the first dummy pattern BP1 is disposed in a region where the first light shielding area BA1 of the display panel DP and the transparent area of the touch screen panel TP overlap.

The first dummy pattern BP1 may include a light shielding material capable of shielding light.

Accordingly, the display device with the touch screen panel according to the first embodiment disposes the dummy pattern BP1 in the third light shielding area BA3 of the touch screen panel TP, in which the first light shielding area BA1 of the display panel DP and the second light shielding area BA2 of the touch screen panel TP do not overlap each other, thereby preventing a light leakage resulting from a bubble, which may be generated in a contact portion of the display panel DP and the touch screen panel TP. As such, a display quality of the display panel may be improved.

However, in the display device with the touch screen panel, when the first dummy pattern BP1 is formed in a plurality of patterns, a small amount of light may be leaked between the plurality of patterns.

A display device with a touch screen panel according to a second embodiment is configured such that leaked light is more completely shielded than through a first dummy pattern.

A display device with a touch screen panel according to a second embodiment is described with reference to FIGS. 6 to 8.

Figure 6:
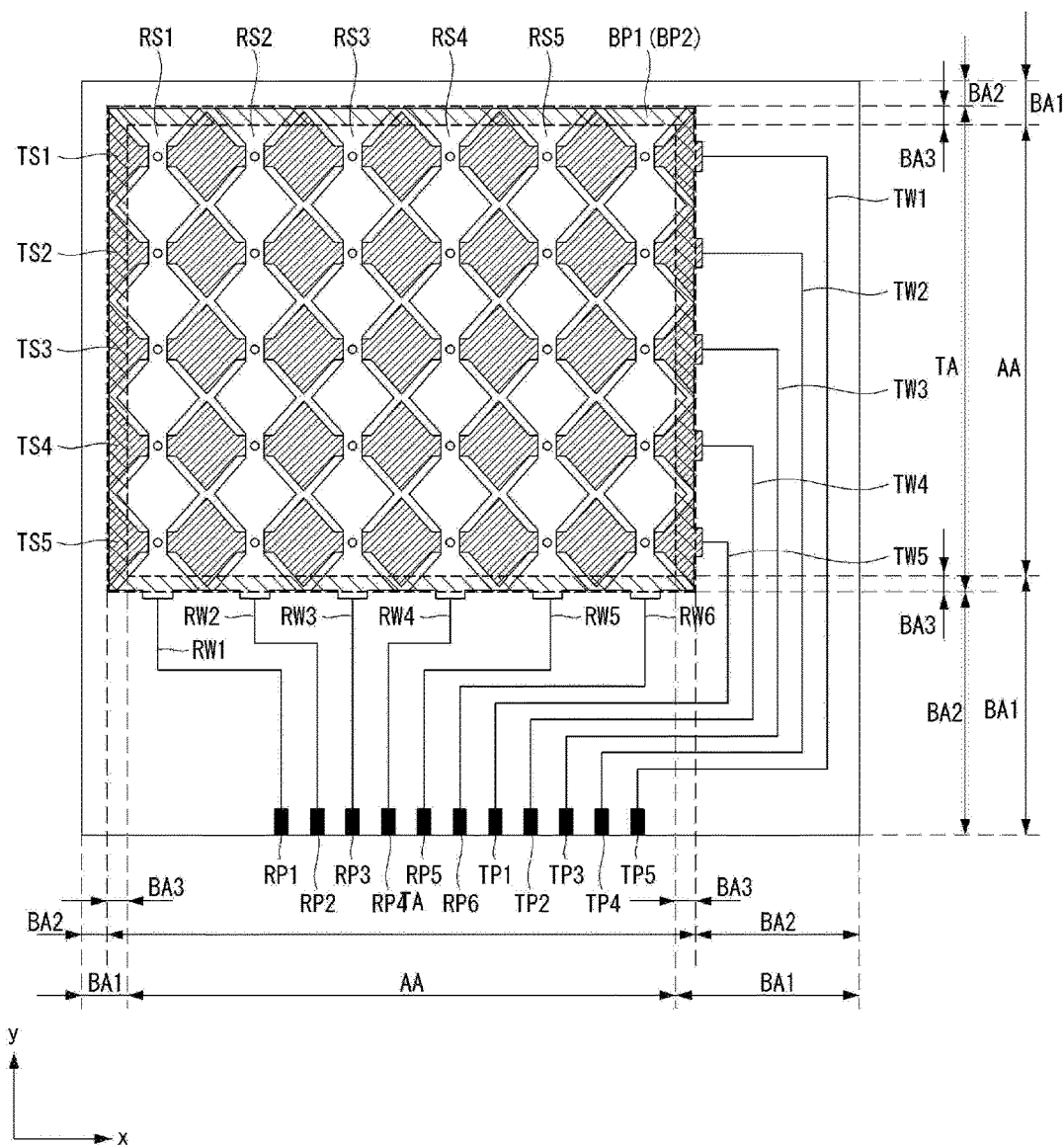
FIG. 6 is a plan view of a display device with a touch screen panel according to a second embodiment.
Figure 7A:
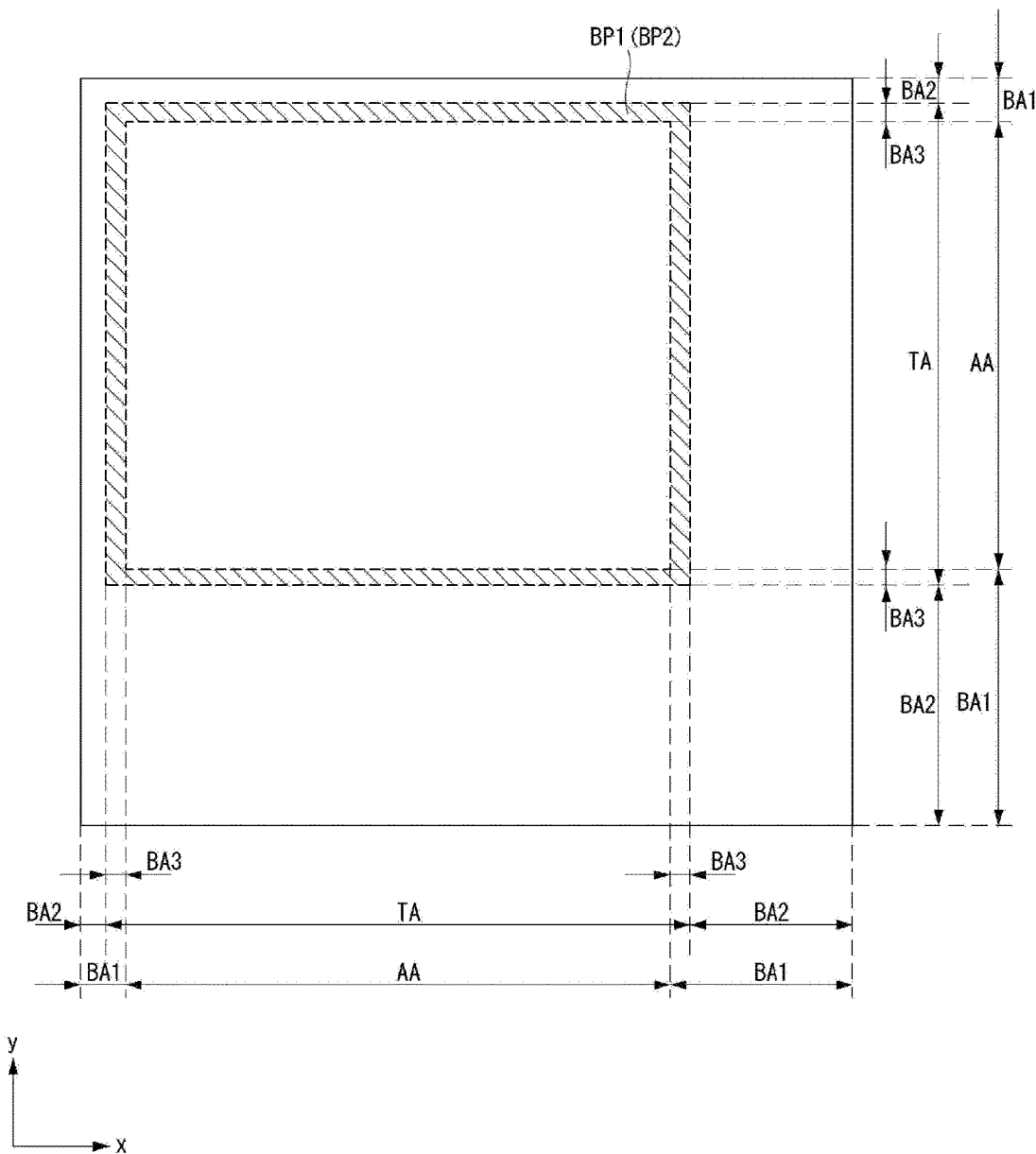
FIG. 7A is a plan view schematically showing an example of a dummy pattern disposed in a third light shielding area shown in FIG. 6.
Figure 7B:
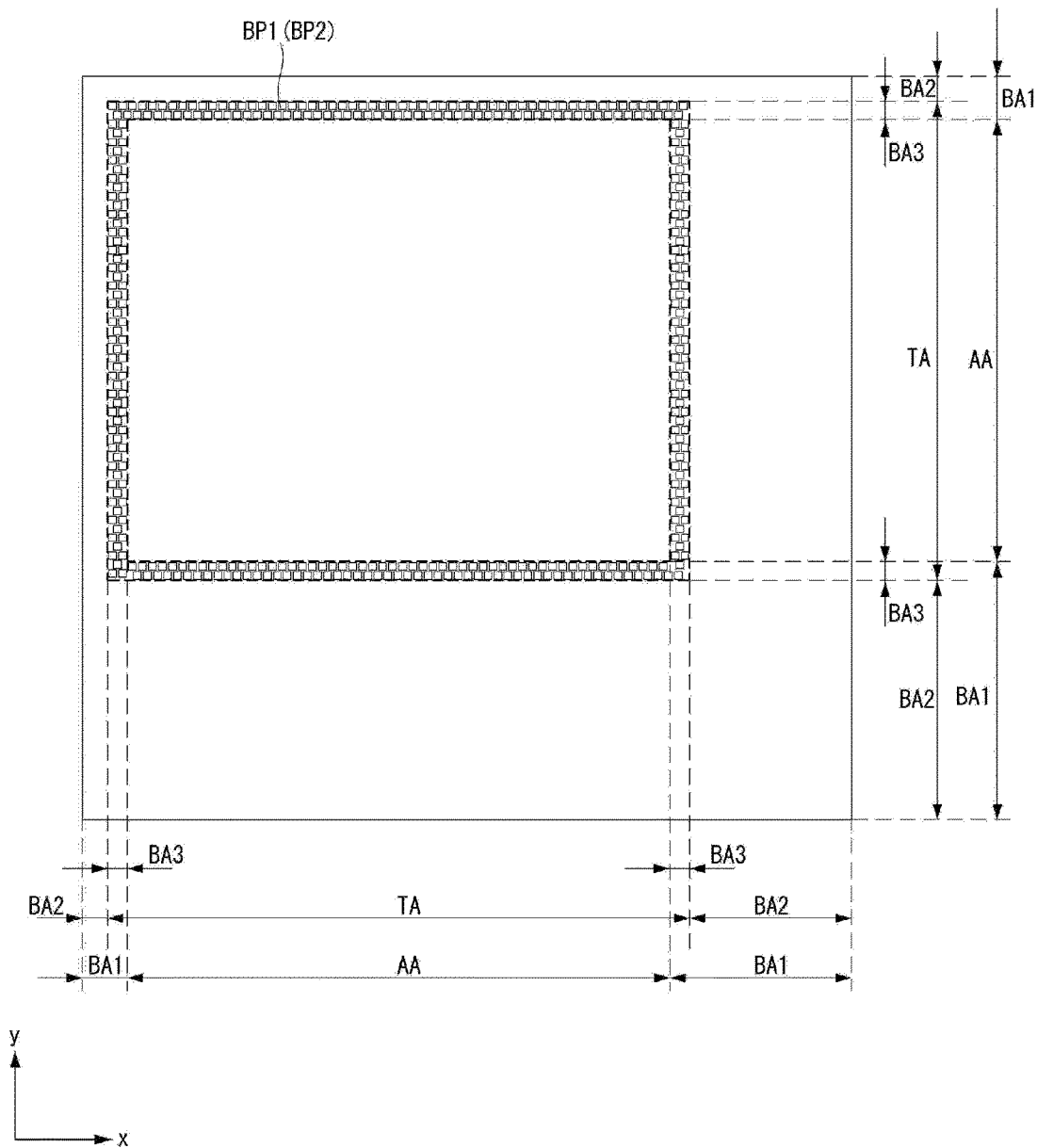
FIG. 7B is a plan view schematically showing another example of a dummy pattern disposed in a third light shielding area shown in FIG. 6.

FIG. 6 is a plan view of a display device with a touch screen panel according to a second embodiment. FIG. 7A is a plan view schematically showing an example of a dummy pattern disposed in a third light shielding area shown in FIG. 6, and FIG. 7B is a plan view schematically showing another example of a dummy pattern disposed in a third light shielding area shown in FIG. 6. FIG. 8 is a cross-sectional view schematically showing a portion of FIG. 6.

Figure 8:
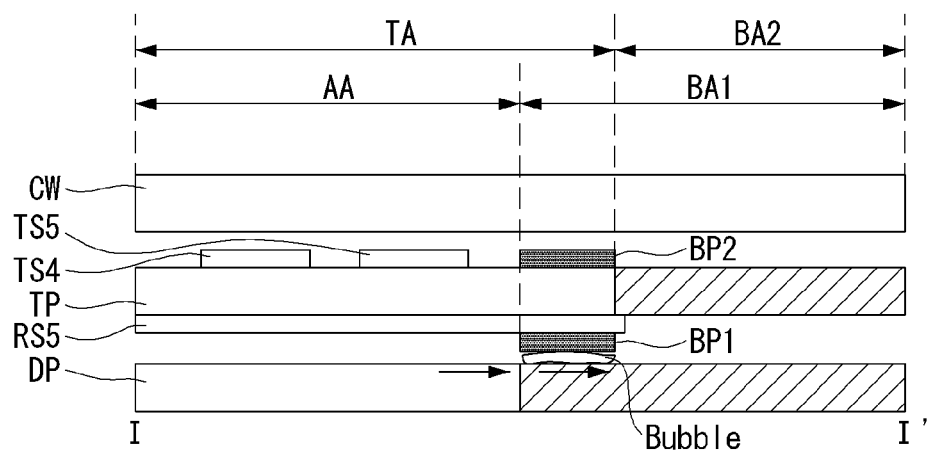
FIG. 8 is a cross-sectional view schematically showing a portion of FIG. 6.

Referring to FIGS. 6 to 8, a display device with a touch screen panel according to a second embodiment includes a display panel DP, a touch screen panel TP disposed on the display panel DP, and a cover window CW attached to the touch screen panel TP using an adhesive, for example, an optically clear adhesive.

The display panel DP includes an active area AA, on which information is displayed, and a first light shielding area BA1 positioned outside the active area AA. Display elements may be disposed in the active area AA, and lines used to supply various signals to the display elements and a display driver may be disposed in the first light shielding area BA1. The display panel DP may use a panel of a flat panel display, such as a liquid crystal display (LCD), an organic light emitting diode (OLED) display, a field emission display (FED), a plasma display panel (PDP), and electrophoresis display (EPD).

The touch screen panel TP includes a touch area TA, a second light shielding area BA2, and a third light shielding area BA3. In some embodiments, the touch area TA and the third light shielding area BA3 are made of a transparent material and the second light shielding area BA2 is made of a light shielding material. Furthermore, the third light shielding area BA3 is a region of the transparent area of the touch screen panel TP that overlaps with the first light shielding area BA1 of the display panel DP.

The touch area TA includes first touch electrodes TS1 to TS5 and second touch electrodes RS1 to RS6 which are disposed to cross each other.

The first touch electrodes TS1 to TS5 may be formed or located, on one surface of the touch screen panel TP, and the second touch electrodes RS1 to RS6 may be formed or located, on the another surface of the touch screen panel TP, for example in a surface opposite to the surface where the first touch electrodes TS1 to TS5 are formed or located. In some embodiments, the first touch electrodes TS1 to TS5 and the second touch electrodes RS1 to RS6 may be formed or located, on one of both surfaces of the touch screen panel TP. In this embodiment, an insulating pattern is disposed at crossings of the first touch electrodes TS1 to TS5 and the second touch electrodes RS1 to RS6. The insulating pattern prevents the first touch electrodes TS1 to TS5 and the second touch electrodes RS1 to RS6 from contacting each other.

The second light shielding area BA2 is positioned outside the touch area TA. The second light shielding area BA2 includes first and second routing wires TW1 to TW5 and RW1 to RW6 for transmitting and receiving signals to and from the first and second touch electrodes TS1 to TS5 and RS1 to RS6 and first and second touch pads TP1 to TP5 and RP1 to RP6 which are connected to the first and second routing wires TW1 to TW5 and RW1 to RW6 and transmit and receive signals to and from the outside.

The third light shielding area BA3 is an area ranging from a start position of the first light shielding area BA1 of the display panel DP to a start position of the second light shielding area BA2 of the touch screen panel TP.

At least one first dummy pattern BP1 is disposed on a lower surface of the third light shielding area BA3 of the touch screen panel TP and surrounds the active area AA of the display panel DP. For example, the first dummy pattern BP1 surrounding the active area AA may be disposed as one pattern in the third light shielding area BA3 on the lower surface of the touch screen panel TP, or may be divided into a plurality of patterns. In one embodiment, the first dummy pattern BP1 is disposed in a region where the first light shielding area BA1 of the display panel DP and the transparent area of the touch screen panel TP overlap.

Further, at least one second dummy pattern BP2 is disposed on an upper surface of the third light shielding area BA3 of the touch screen panel TP and surrounds the active area AA of the display panel DP. For example, the second dummy pattern BP2 surrounding the active area AA may be disposed as one pattern in the third light shielding area BA3 on the upper surface of the touch screen panel TP, or the second dummy pattern BP2 may be divided into a plurality of patterns BP2.

The first dummy pattern BP1 and the second dummy pattern BP2 may include a light shielding material capable of shielding light.

One of the first dummy pattern BP1 and the second dummy pattern BP2 may be formed as one pattern, and the other may be formed as a plurality of patterns. Both the first dummy pattern BP1 and the second dummy pattern BP2 may be formed as one pattern or a plurality of patterns.

When the first dummy pattern BP1 and the second dummy pattern BP2 are disposed in the third light shielding area BA3 as one pattern, the first dummy pattern BP1 and the second dummy pattern BP2 may overlap each other. When the first dummy pattern BP1 and the second dummy pattern BP2 are disposed in the third light shielding area BA3 as a plurality of patterns, the first dummy pattern BP1 and the second dummy pattern BP2 may be alternately disposed. In this instance, when the first dummy pattern BP1 and the second dummy pattern BP2 are disposed to partially overlap each other, improving the shielding of light.

The display device with the touch screen panel according to the second embodiment disposes the first and second dummy patterns BP1 and BP2 on the upper and lower surfaces of the third light shielding area BA3 of the touch screen panel TP, in which the first light shielding area BA1 of the display panel DP and the second light shielding area BA2 of the touch screen panel TP do not overlap each other. This configuration reduces a light leakage resulting from a bubble, which may be generated in a contact portion of the display panel DP and the touch screen panel TP. As such, a display quality of the display panel may be improved.

Although embodiments have been described with reference to a number of illustrative embodiments thereof, it should be understood that numerous other modifications and embodiments can be devised by those skilled in the art that will fall within the scope of the principles of this disclosure. For example, the various embodiments described and illustrated that the touch screen panel and the display panel have a rectangular shape. However, the touch screen panel and the display panel may be a circle, an oval, a triangle, a polygon, etc. Further, when the touch screen panel according to the various embodiments is applied to the OLED display, the touch screen panel can be interpreted to include a barrier layer or an encapsulation layer. Thus, various variations and modifications are possible in the component parts and/or arrangements of the subject combination arrangement within the scope of the appended claims.

What is claimed is:
1. A display device with a panel comprising:
   a display panel including:
      an active area on which information is displayed, and
      a first light shielding area positioned outside of the active area, wherein information is not displayed within the first light shielding area;

a panel disposed on the display panel, the panel including:
a first transparent panel area having a size wider than the active area of the display panel, the first transparent panel having a plurality of touch electrodes,
a second light shielding area positioned outside the first transparent panel area, and
a transparent area ranging from a start position of the first light shielding area to a start position of the second light shielding area, the transparent area at least partially overlapping one or more touch electrodes of the plurality of touch electrodes; and
at least one dummy pattern overlapping the transparent area of the panel, wherein the dummy pattern is configured to shield light leaked from the first light shielding area.

2. The display device of claim 1, wherein the panel has an upper surface and a lower surface, wherein the lower surface faces the display panel, and the at least one dummy pattern is disposed on one of the upper surface and the lower surface of the panel.

3. The display device of claim 1, wherein the panel has an upper surface and a lower surface, wherein the lower surface faces the display panel, wherein the at least one dummy pattern comprises a first dummy pattern disposed on the lower surface of the panel.

4. The display device of claim 3, wherein the at least one dummy pattern further comprises a second dummy pattern disposed on the upper surface of the panel.

5. The display device of claim 4, wherein the first dummy pattern and the second dummy pattern are disposed to at least partially overlap each other.

6. The display device of claim 5, wherein at least one of the first dummy pattern and the second dummy pattern comprises a pattern with a plurality of unconnected areas.

7. The display device of claim 1, wherein the at least one dummy pattern includes a first dummy pattern disposed in the transparent area on one surface of the panel.

8. The display device of claim 7, wherein the at least one dummy pattern includes a second dummy pattern disposed in the transparent area on another surface of the panel.

9. The display device of claim 8, wherein the first dummy pattern is disposed in the transparent area as a continuous area, the second dummy pattern is disposed in the transparent area as a pattern with a plurality of unconnected areas, and the second dummy pattern overlaps the first dummy pattern.

10. The display device of claim 8, wherein the first and second dummy pattern are disposed in the transparent area, the first and second dummy pattern are disposed as patterns with a plurality of unconnected areas; and the first dummy pattern and the second dummy pattern are disposed so that their respective areas are alternately disposed.

11. The display device of claim 8, wherein the second dummy pattern is disposed in the transparent area as a continuous area, the first dummy pattern is disposed in the transparent area as a pattern with a plurality of unconnected areas, and the first dummy pattern overlaps the second dummy pattern.

12. The display device of claim 1, wherein the panel is a touch screen panel and the first panel area is a touch area.

13. A display device comprising:
a display panel including an active area on which information is displayed, and a first light shielding area adjacent to the active area;
a second panel disposed on the display panel, the second panel including:
a transparent area overlapping the active area of the display panel and extending beyond the active area of the display panel, and
a second light shielding area positioned outside the transparent area, the second light shielding area not overlapping with the transparent area; and
at least one dummy pattern disposed in a region where the first light shielding area of the display panel and the transparent area of the second panel overlap, the dummy pattern configured to shield light leaked from the first light shielding area, wherein the dummy pattern is between the display panel and the second panel,
wherein the second panel at least partially includes one or more touch electrodes in the region where the first light shielding area of the display panel and the transparent area of the second panel overlap.

14. The display device of claim 13, wherein the second panel is a touch panel.

15. The display device of claim 13, wherein the at least one dummy pattern is disposed between the display panel and the second panel.

16. The display device of claim 13, wherein the second panel has an upper surface and a lower surface, wherein the lower surface faces the display panel, and wherein the at least one dummy pattern in disposed on one of the upper surface and the lower surface of the second panel.

17. The display device of claim 13, wherein the second panel has an upper surface and a lower surface, wherein the lower surface faces the display panel, and wherein the at least one dummy pattern comprises:
a first dummy pattern disposed on the lower surface of the second panel, and
a second dummy pattern disposed on the upper surface of the second panel.

18. The display device of claim 13, wherein the at least one dummy pattern comprises a plurality of unconnected areas.

19. The display device of claim 13, wherein the at least one dummy pattern is made of a light shielding material.

20. The display device of claim 13, wherein the at least one dummy pattern is made a metal or alloy.

* * * * *